(12) United States Patent
Jing (10) Patent No.: US 10,864,558 B2
(45) Date of Patent: Dec. 15, 2020

(54) APPARATUS FOR CLEANING TRANSFER PLATE AND METHOD FOR CLEANING THE SAME

(71) Applicants: BOE Technology Group Co., Ltd., Beijing (CN); HEFEI BOE OPTOELECTRONICS TECHNOLOGY CO., LTD., Hefei (CN)

(72) Inventor: Yangkun Jing, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 293 days.

(21) Appl. No.: 15/745,086

(22) PCT Filed: Apr. 25, 2017

(86) PCT No.: PCT/CN2017/081857
§ 371 (c)(1),
(2) Date: Jan. 15, 2018

(87) PCT Pub. No.: WO2017/190606
PCT Pub. Date: Nov. 9, 2017

(65) Prior Publication Data
US 2018/0169715 A1    Jun. 21, 2018

(30) Foreign Application Priority Data
May 4, 2016  (CN) .......................... 2016 1 0289765

(51) Int. Cl.
*B08B 1/04* (2006.01)
*B08B 3/08* (2006.01)
(Continued)

(52) U.S. Cl.
CPC .............. *B08B 3/123* (2013.01); *B08B 1/002* (2013.01); *B08B 1/02* (2013.01); *B08B 1/04* (2013.01);
(Continued)

(58) Field of Classification Search
CPC .... B08B 1/02; B08B 1/04; B08B 3/08; B08B 11/00; B41F 35/00; B41F 35/001;
(Continued)

(56) References Cited

U.S. PATENT DOCUMENTS 3,438,078 A     4/1969  Muselaers
2005/0257815 A1  11/2005  Ho et al.
(Continued)

FOREIGN PATENT DOCUMENTS

CN     1164467 A    11/1997
CN     1168836 A    12/1997
(Continued)

OTHER PUBLICATIONS

International Search Report and English translation of International Search Report for International Application No. PCT/CN2017/081857, dated Aug. 8, 2017, 6 pages.
(Continued)

*Primary Examiner* — Randall E Chin
(74) *Attorney, Agent, or Firm* — Westman, Champlin & Koehler, P.A.

(57) ABSTRACT

The present disclosure relates to an apparatus for cleaning a transfer plate and a method for cleaning the same. The apparatus for cleaning a transfer plate includes a rack, a cleaning tank, a cleaning roller, at least a part of a cylindrical surface of the cleaning roller is located inside the cleaning tank, and a transfer plate is provided on the cylindrical surface of the cleaning roller fixing mechanism for fixing a transfer plate wound around the cylindrical surface; protru-
(Continued)

sions are provided on the cylindrical surface, and a vacuum suction hole for sucking the transfer plate is provided on periphery of a protrusion; a friction cleaning device, and the friction cleaning device frictionally cleans the transfer plate through a relative movement between the cleaning roller and the friction cleaning device; a drive device configured to generate a relative movement between the cleaning roller and the friction cleaning device.

16 Claims, 4 Drawing Sheets

(51) Int. Cl.
*B08B 3/12* (2006.01)
*B08B 1/02* (2006.01)
*B08B 1/00* (2006.01)
*B41L 41/00* (2006.01)
*B41F 35/00* (2006.01)
*G02F 1/00* (2006.01)

(52) U.S. Cl.
CPC ................ *B08B 3/08* (2013.01); *B41F 35/00* (2013.01); *B41L 41/00* (2013.01); *G02F 1/00* (2013.01)

(58) Field of Classification Search
CPC .......... B41F 35/06; B41L 41/00; B41L 41/06; H01L 21/304
See application file for complete search history.

(56) References Cited

U.S. PATENT DOCUMENTS

2006/0092359 A1 5/2006 Lee
2016/0304291 A1* 10/2016 Strauch .................. B65G 47/53

FOREIGN PATENT DOCUMENTS

| CN | 102189089 A | 9/2011 |
| CN | 103506238 A | 1/2014 |
| CN | 103962335 A | 8/2014 |
| CN | 103962335 B | 9/2015 |
| CN | 105921431 A | 9/2016 |
| EP | 0795402 A1 | 9/1997 |
| EP | 0796106 A1 | 10/1997 |
| JP | 10314692 A | 12/1998 |
| JP | 2009231668 A | 10/2009 |
| KR | 20140014786 A | 2/2014 |

OTHER PUBLICATIONS

Written Opinion and English translation of Box No. 5 of Written Opinion for international Application No. PCT/CN2017/081857, dated Aug. 8, 2017, 6 pages.
First Office Action, including Search Report, for Chinese Patent Application No. 201610289765.0, dated Oct. 30, 2017, 11 pages.

* cited by examiner

APPARATUS FOR CLEANING TRANSFER PLATE AND METHOD FOR CLEANING THE SAME

CROSS-REFERENCE TO RELATED APPLICATION

This application is a Section 371 National Stage Application of International Application No. PCT/CN2017/081857, filed Apr. 25, 2017, and published as WO 2017/190606 on Nov. 9, 2017, and claims the benefit of Chinese Patent Application No. 201610289765.0 filed on May 4, 2016 in the State Intellectual Property Office of China, the whole disclosure of which are incorporated herein by reference.

BACKGROUND OF THE INVENTION

Field of the Invention

The present disclosure relates to the field of cleaning technology, and especially to an apparatus for cleaning a transfer plate and a method for cleaning the same.

Description of the Related Art

In process of achieving alignment of liquid crystal molecules when a liquid crystal display panel is produced, some fine recesses in a mesh arrangement are provided on the transfer plate for printing PI film. These recesses may help to coat the PI liquid more evenly on the transfer plate, improving the printing quality of the PI film. However, the transfer plate needs to be cleaned to remove the solidified PI liquid residue in its recesses in the printing process of the PI film.

Conventionally, an apparatus for cleaning a transfer plate uses a cleaning method in which the transfer plate is expanded into a plate shape and immersed in a cleaning liquid to perform an ultrasonic cleaning. This cleaning method has a poor cleaning efficiency and cannot effectively remove the solidified PI liquid residue in the recesses of the transfer plate, resulting in a decrease in the print quality of the PI film, thereby reducing production yield of the liquid crystal display panel.

SUMMARY OF THE INVENTION

Accordingly, the present disclosure provides an apparatus for cleaning a transfer plate, comprising
  a rack;
  a cleaning tank mounted on the rack and configured to hold a cleaning fluid therein;
  a cleaning roller pivotally mounted to the rack, at least a part of a cylindrical surface of the cleaning roller being located inside the cleaning tank, wherein a transfer plate fixing mechanism is provided on the cylindrical surface of the cleaning roller for fixing a transfer plate wound around the cylindrical surface, protrusions which correspond to recesses in the transfer plate one to one are provided on the cylindrical surface of the cleaning roller, and a vacuum suction hole for sucking the transfer plate is provided on periphery of a protrusion, and wherein the protrusion is configured to raise up a bottom surface of the recess in a direction toward an opening of the recess at a side of the transfer plate facing away from the recess when the vacuum suction hole sucks the transfer plate;
  a friction cleaning device mounted inside the cleaning tank, the friction cleaning device being configured to contact with the transfer plate wound around the cleaning roller and to frictionally clean the transfer plate through a relative movement between the cleaning roller and the friction cleaning device; and
  a drive device driving the cleaning roller and/or the friction cleaning device so as to generate the relative movement between the cleaning roller and the friction cleaning device.

Optionally, the friction cleaning device comprises a friction roller pivotally mounted in the cleaning tank, and bristles for frictionally cleaning the transfer plate are provided on the cylindrical surface of the friction roller.

Optionally, the drive device is a motor.

Optionally, the friction cleaning device comprises a friction plate fixed inside the cleaning tank, and bristles for frictionally cleaning the transfer plate are provided on the friction plate.

Optionally, the apparatus further comprises an ultrasonic cleaning device, which comprises an ultrasonic transducer provided on a bottom surface of the cleaning tank and an ultrasonic generator electrically connected to the ultrasonic transducer.

Optionally, the cleaning tank is provided with a concentration detecting device for detecting the concentration of impurities in the cleaning liquid.

Optionally, the apparatus further comprises a reservoir mounted on the rack and configured to receive the cleaning liquid discharged from the cleaning tank, and a liquid feeding pump for pumping the cleaning liquid in the reservoir into the cleaning tank.

Optionally, the apparatus comprises a filtering device for filtering the cleaning liquid pumped into the cleaning tank from the reservoir.

Optionally, the transfer plate fixing mechanism is a fixing clip.

The present disclosure further provides a method for cleaning a transfer plate, comprising:
  winding and fixing the transfer plate onto a cylindrical surface of a cleaning roller, such that a side of the transfer plate provided with a recess faces away from the cylindrical surface of the cleaning roller,
  sucking the transfer plate with vacuum suction holes provided in the cylindrical surface of the cleaning roller, such that a protrusion provided in the vacuum suction hole raises up a bottom surface of the recess corresponding to the protrusion in a direction toward an opening of the recess at a side of the transfer plate facing away from the recess, and
  immersing the transfer plate into a cleaning liquid in a cleaning tank, and frictionally cleaning the transfer plate by relative rotation between a friction cleaning device and the cleaning roller.

Optionally, frictionally cleaning the transfer plate by relative rotation between the friction cleaning device and the cleaning roller comprises following steps:
  frictionally cleaning the transfer plate by relative rotation between a friction roller and the cleaning roller; or
  frictionally cleaning the transfer plate by relative rotation between a friction plate and the cleaning roller.

Optionally, the step of frictionally cleaning the transfer plate by relative rotation between the friction roller and the cleaning roller comprises:
  driving the friction roller to rotate to drive the cleaning roller to rotate so as to frictionally clean the transfer plate; or driving the cleaning roller to rotate to drive the friction roller to rotate so as to frictionally clean the transfer plate; or driving both the cleaning roller and the friction roller to rotate relatively so as to frictionally clean the transfer plate.

Optionally, after the step of driving both the cleaning roller and the friction roller to rotate relatively to frictionally clean the transfer plate, the method further comprises:

driving the cleaning roller to rotate to drive the friction roller to rotate so as to frictionally clean the transfer plate, and cleaning the transfer plate with deionized water.

Optionally, the method further comprises:

ultrasonically vibrating the transfer plate in the cleaning liquid by using an ultrasonic cleaning device, and outputting an ultrasonic wave of a corresponding frequency according to the diameter of the recess in the transfer plate, when frictionally cleaning the transfer plate by relative rotation between the friction cleaning device and the cleaning roller.

Optionally, outputting an ultrasonic wave of a corresponding frequency according to the diameter of the recess in the transfer plate comprises:

outputting an ultrasonic wave of 40 kHz when the diameter of the recess in the transfer plate is larger than 10 μm;

outputting an ultrasonic wave of 72 kHz when the diameter of the recess in the transfer plate is less than or equal to 10 μm.

Optionally, after frictionally cleaning the transfer plate by relative rotation between the friction cleaning device and the cleaning roller, the method further comprises:

detecting the concentration of impurities in the cleaning liquid by a concentration detecting device; and replacing the cleaning liquid when the concentration of impurities in the cleaning liquid exceeds a preset threshold.

BRIEF DESCRIPTION OF THE DRAWINGS

These and/or other aspects and advantages of the present disclosure will become apparent and readily appreciated from the following description of the alternative embodiments, taken in conjunction with the accompanying drawings, in which.

DETAILED DESCRIPTION OF PREFERRED EMBODIMENTS

The technical solutions in the embodiments of the present disclosure are clearly and completely described below with reference to the accompanying drawings in the embodiments of the present disclosure. Apparently, the described embodiments are merely a part, not all, of the embodiments of the present disclosure. All other embodiments obtained by persons of ordinary skill in the art based on the embodiments of the present disclosure without creative efforts shall fall within the protection scope of the present disclosure.

Figure 1:
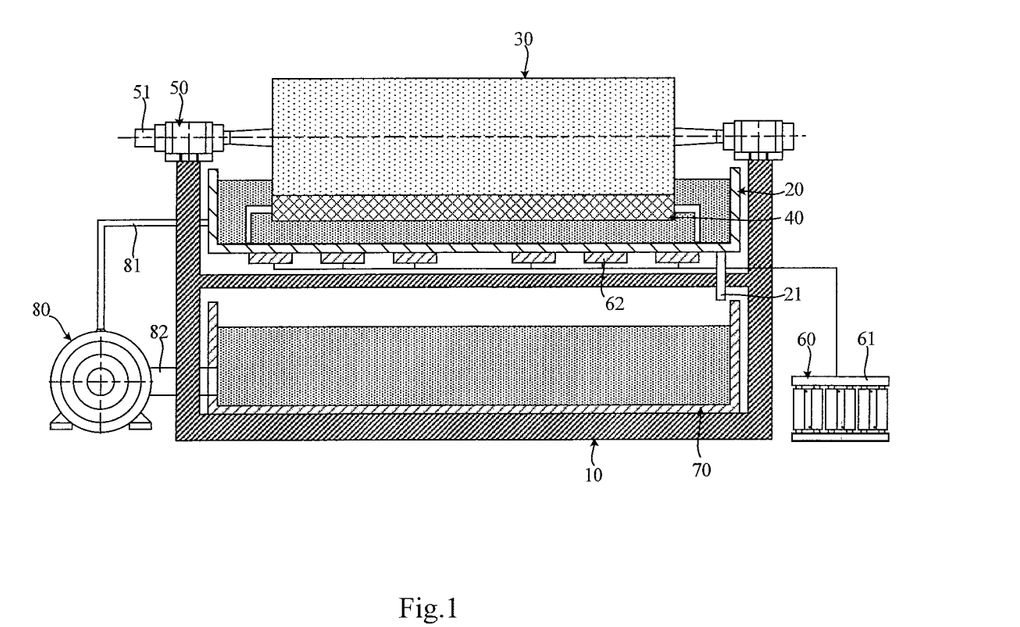
FIG. 1 is a schematic structural view of an apparatus for cleaning a transfer plate according to an embodiment of the present disclosure.
Figure 2A:
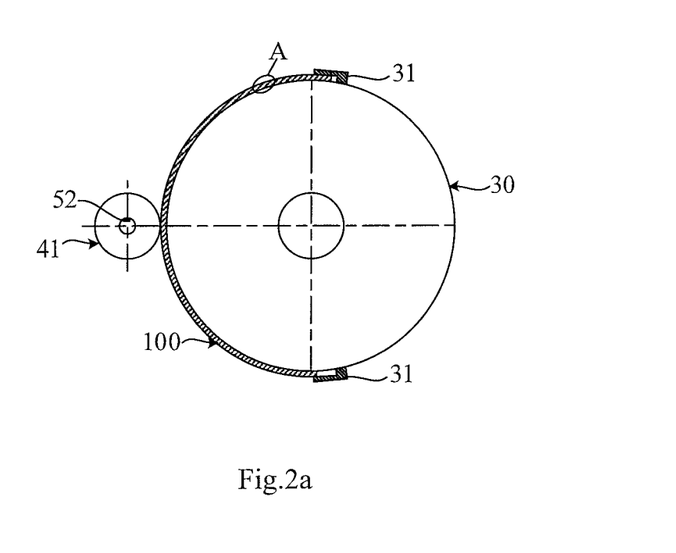
FIG. 2a is a schematic structural view of a friction cleaning device in an embodiment.
Figure 2B:
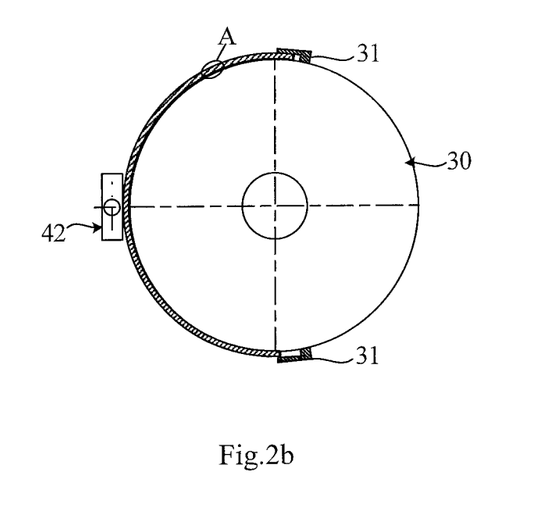
FIG. 2b is a schematic structural view of a friction cleaning device in another embodiment.

As shown in FIG. 1, there is provided an apparatus for cleaning a transfer plate in the present embodiment, which comprises:

a rack 10;

a cleaning tank 20 mounted on the rack 10 and configured to hold a cleaning fluid;

a cleaning roller 30 pivotally mounted to the rack 10, at least a part of a cylindrical surface of the cleaning roller 30 being located inside the cleaning tank 20, as shown in FIGS. 2a and 2b, a transfer plate fixing mechanism being provided on the cylindrical surface of the cleaning roller 30 for fixing a transfer plate 100 wound around the cylindrical surface. Optionally, as shown in FIGS. 2a and 2b, the fixing mechanism are fixing clips 31 which can clamp two ends of the transfer plate 100 so that the transfer plate 100 may be wound on the cylindrical surface of the cleaning roller 30. Optionally, a diameter of the cylindrical surface of the cleaning roller 30 is larger than that of the printing roller which cooperates with the transfer plate 100, so that the transfer plate 100 is stretched while being wound around the cylindrical surface of the cleaning roller 30, such that the recesses 101 therein are expanded.

Figure 3:
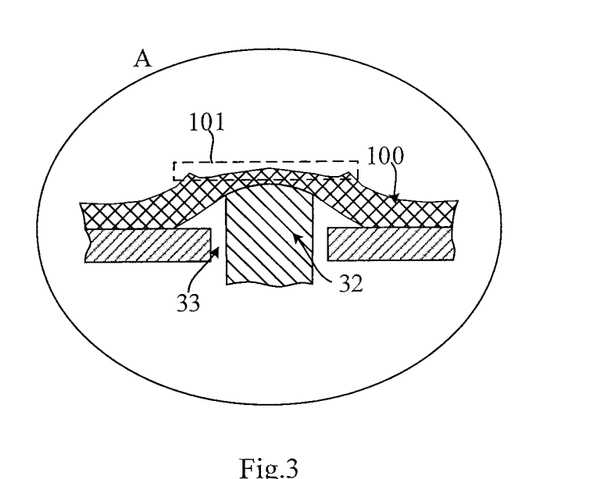
FIG. 3 is a partially enlarged view of region A shown in FIGS. 2a and 2b.

As shown in FIG. 3, protrusions 32 which correspond to the recesses 101 in the transfer plate 100 in a one-to-one correspondence are provided on the cylindrical surface of the cleaning roller 30, and a vacuum suction hole 33 for sucking the transfer plate 100 is provided on periphery of a protrusion 32. The protrusion 32 is configured to raise up a bottom surface of the recess 101 in a direction toward an opening of the recess 101 at a side of the transfer plate 100 facing away from the recess 101 when the vacuum suction hole 33 sucks the transfer plate 100.

A friction cleaning device 40 is mounted inside the cleaning tank 20, and the friction cleaning device 40 is configured to contact with a transfer plate 100 wound around the cleaning roller 30 and to frictionally clean the transfer plate 100 through a relative movement between the cleaning roller 30 and the friction cleaning device 40.

A drive device 50 is mounted on the rack, and the drive device 50 is connected to the cleaning roller 30 and/or the friction cleaning device 40 in a driving manner, and configured to generate a relative movement between the cleaning roller 30 and the friction cleaning device 40. Optionally, as shown in FIG. 1, the drive device 50 comprises a motor 51 connected to the cleaning roller 30.

In the process of cleaning the transfer plate conducted by the apparatus for cleaning a transfer plate provided by the present disclosure, the transfer plate 100 to be cleaned is wound around and fixed to the cylindrical surface of the cleaning roller 30 with the side of the transfer plate 100 having recesses 101 facing outward, and then the vacuum suction hole 33 sucks the side of the transfer plate 100 facing away from the recesses 101, the protrusion 32 in the vacuum suction hole 33 raises up the bottom surface of the recess 101 corresponding to the protrusion 32 in the direction toward the opening of the recess 101 to expand the recesses 101 in the transfer plate 100. The cleaning tank 20 is filled with a cleaning liquid so as to immerse at least a part of the cylindrical surface of the cleaning roller 30 in the cleaning liquid, and the cleaning roller 30 is rotated by the drive device to cause the transfer plate 100 to be infiltrated with the cleaning liquid, and to cause a relative movement between the friction cleaning device 40 and the cleaning roller 30, so that the friction cleaning device 40 rubs the transfer plate 100 to clean the transfer plate 100.

In the apparatus for cleaning a transfer plate, since the recesses 101 in the transfer plate 100 is expanded in the cleaning process, the solidified PI liquid residue in the recesses 101 is exposed for cleaning, the cleaning efficiency is high, and the solidified PI liquid residue in the recesses 101 in the transfer plate 100 can be effectively removed, thereby improving the printing quality of the PI film and further improving the production yield of the liquid crystal display panel.

In a specific embodiment, the friction cleaning device 40 may be implemented in the following two manners:

In an implementation, as shown in FIG. 2a, the friction cleaning device 40 comprises a friction roller 41 pivotally mounted in the cleaning tank 20, and in order to further improve the cleaning effect, bristles for frictionally cleaning the transfer plate 100 are provided on the cylindrical surface of the friction roller 41.

When the transfer plate 100 is cleaned by the friction roller 41, optionally, the drive device 50 further includes a motor 52 connected to the friction roller 41. The motor 52 is configured to drive the friction roller 41 to rotate to enhance the cleaning effect.

The relative movement between the friction roller 41 and the cleaning roller 30 may be as follows:

In one way, the friction roller 41 is a drive part and the cleaning roller 30 is a driven part, such that the friction roller 41 drives the cleaning roller 30 to rotate;

In another way, the friction roller 41 is the driven part and the cleaning roller 30 is the drive part, such that the cleaning roller 30 drives the friction roller 41 to rotate.

In yet another way, the friction roller 41 and the cleaning roller 30 rotate relative to each other.

In another implementation, as shown in FIG. 2b, the friction cleaning device 40 comprises a friction plate 42 fixed inside the cleaning tank 20, and in order to further improve the cleaning effect, bristles for friction cleaning the transfer plate 100 are provided on the friction plate 42.

In an optional embodiment shown in FIG. 1, to further improve the cleaning effect, the cleaning device provided by the present embodiment further comprises an ultrasonic cleaning device 60, which comprises an ultrasonic transducer 62 provided on a bottom surface of the cleaning tank 20 and an ultrasonic generator 61 electrically connected to the ultrasonic transducer 62.

In the process of cleaning the transfer plate 100, the ultrasonic generator 61 in the ultrasonic cleaning device 60 may be started, so that the ultrasonic generator 61 controls the ultrasonic transducer 62 to send ultrasonic waves into the cleaning tank 20 to enhance the cleaning effect.

In an optional embodiment, the cleaning tank 20 is provided with a concentration detecting device for detecting the concentration of impurities in the cleaning liquid. The concentration detection device is used to detect the concentration of impurities in the cleaning liquid, and when the detected impurity concentration exceeds a normal usable range, the cleaning liquid should to be replaced to ensure the cleaning effect.

In an optional embodiment as shown in FIG. 1, the cleaning tank 20 is provided with a discharge port 21 for discharging the cleaning liquid. The cleaning device provided in present embodiment further includes a reservoir 70 mounted on the rack 10 for receiving the cleaning liquid discharged from the cleaning tank 20, and a liquid feeding pump 80 for pumping the cleaning liquid in the reservoir 70 into the cleaning tank 20, and a liquid feeding pump 80 for pumping the cleaning liquid in the reservoir 70 into the cleaning tank 20. The liquid feeding pump 80 includes a first pipe 81 communicated with the cleaning tank 20 and a second pipe 82 communicated with the reservoir 70. The cleaning liquid discharged through the discharge port 21 of the cleaning tank 20 is stored in the reservoir 70. The cleaning liquid is pumped out of the reservoir 70 through the first pipe 81 by driving of the liquid pump 80 and reenters the cleaning tank 20 through the second pipe 82, in order to achieve the recycling of the cleaning liquid. In a specific implementation process, recycling times of the cleaning liquid may be selected according to required cleaning degree of the transfer plate 100. When the cleaning degree of the transfer plate 100 is required to be high, the cleaning liquid may be used only once. Optionally, in order to reduce the impurities in the reused cleaning liquid, the cleaning device provided in present embodiment further includes a filtering device for filtering the cleaning liquid pumped into the cleaning tank 20 from the reservoir 70.

Optionally, the concentration detection device described above is provided at the position of the discharge port 21 for detecting the concentration of impurities in the discharged cleaning liquid. When the detected impurity concentration does not exceed the normal usable range, the cleaning liquid in the reservoir 70 may be pumped into the cleaning tank 20 to continue to be used. When the detected impurity concentration exceeds the normal usable range, the cleaning liquid should to be replaced. Such a process can be realized by automatic control and the concentration detection device may be connected with a control device. A signal indicating the detected concentration of the impurities in the cleaning liquid is sent to the control device. After receiving the concentration signal, the control device compares it with the preset concentration threshold. When concentration of the impurity exceeds the preset concentration threshold, the control device generates cleaning liquid replacing signals to replace the cleaning fluid. The process of replacing the cleaning fluid may also be achieved by automatic control, an automatic valve may be provided on the discharge port of the cleaning tank 20 to receive the cleaning fluid replacing signal and open the valve to discharge the cleaning fluid. At the same time, a cleaning fluid replenishment tank, in which unused cleaning fluid is filled, may be additionally provided and also controlled by an automatic valve. After the cleaning liquid is discharged from the cleaning tank 20, the automatic valve controlling the replenishment tank is opened to replenish the cleaning tank 20 with cleaning liquid.

Figure 4:
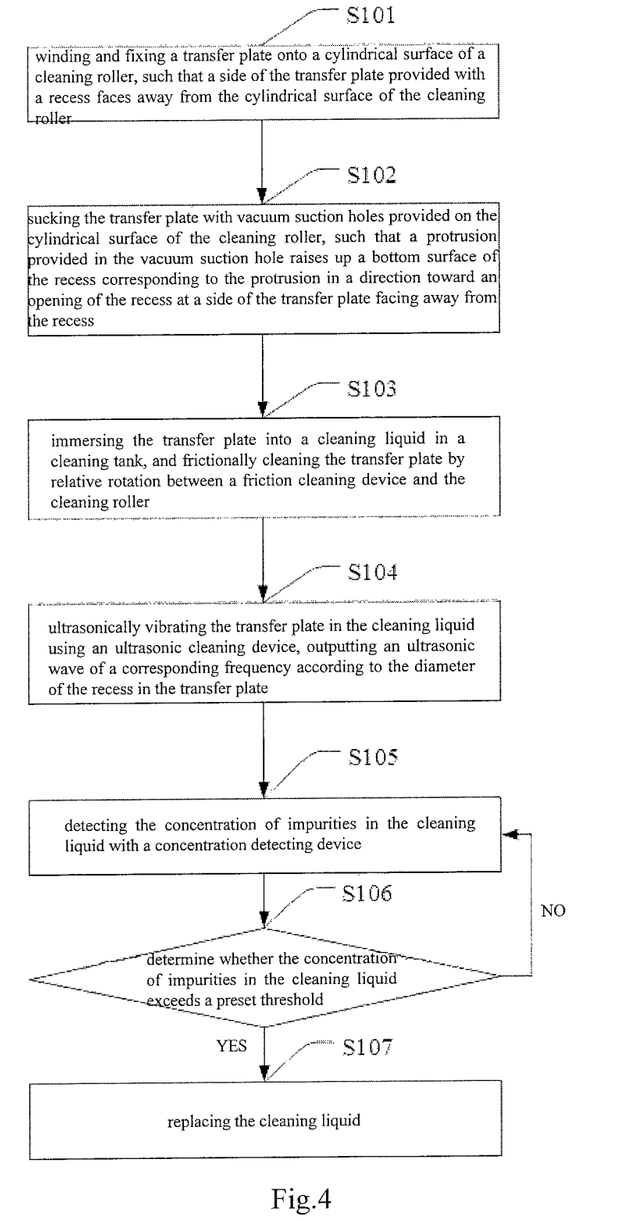
FIG. 4 is a flowchart of a method for cleaning a transfer plate according to an embodiment of the present disclosure.

The present disclosure further provides a method for cleaning a transfer plate, as shown in FIG. 4, comprising:

Step S101, winding and fixing the transfer plate onto a cylindrical surface of a cleaning roller, such that a side of the transfer plate provided with a recess faces away from the cylindrical surface of the cleaning roller, Step S102, sucking the transfer plate with vacuum suction holes provided on the cylindrical surface of the cleaning roller, such that a protrusion provided in the vacuum suction hole raises up a bottom surface of the recess corresponding to the protrusion in a direction toward an opening of the recess at a side of the transfer plate facing away from the recess, Step S103, immersing the transfer plate into a cleaning liquid in a cleaning tank, and frictionally cleaning the transfer plate by relative rotation between a friction cleaning device and the cleaning roller.

In the process of cleaning the transfer plate with the method for cleaning the transfer plate according to the present disclosure, the transfer plate to be cleaned is wound around and fixed to the cylindrical surface of the cleaning roller with the side of the transfer plate having recesses facing outward, and then the vacuum suction hole sucks the side of the transfer plate facing away from the recesses, the protrusion in the vacuum suction hole raises up the bottom surface of the recess corresponding to the protrusion in the direction toward the opening of the recess to expand the recesses in the transfer plate. The cleaning tank is filled with the cleaning liquid so as to immerse at least a part of the cylindrical surface of the cleaning roller in the cleaning liquid, and the cleaning roller is rotated by the drive device to cause the transfer plate to be infiltrated with the cleaning liquid, and to cause a relative movement between the friction cleaning device and the cleaning roller, so that the friction cleaning device rubs the transfer plate to clean the transfer plate.

In the method for cleaning the transfer plate, since the recesses in the transfer plate is expanded in the cleaning process, the solidified PI liquid residue in the recesses is exposed for cleaning, the cleaning efficiency is high, and the solidified PI liquid residue in the recesses in the transfer plate can be effectively removed, thereby improving the printing quality of the PI film and further improving the production yield of the liquid crystal display panel.

In an optional embodiment, in the Step S103, frictionally cleaning the transfer plate by relative rotation between the friction cleaning device and the cleaning roller comprises:

Frictionally cleaning the transfer plate by relative rotation between the friction roller and the cleaning roller; or, Frictionally cleaning the transfer plate by relative rotation between the friction plate and the cleaning roller.

In an optional embodiment, frictionally cleaning the transfer plate by relative rotation between the friction roller and the cleaning roller comprises:

driving the friction roller to rotate to drive the cleaning roller to rotate to frictionally clean the transfer plate; or driving the cleaning roller to rotate to drive the friction roller to rotate to frictionally clean the transfer plate; or driving both the cleaning roller and the friction roller to rotate relatively to frictionally clean the transfer plate.

In an optional embodiment, after driving both the cleaning roller and the friction roller to rotate relatively to frictionally clean the transfer plate, the method further comprises:

driving the cleaning roller to rotate to drive the friction roller to rotate to frictionally clean the transfer plate, and cleaning the transfer plate with deionized water.

Figure 5:
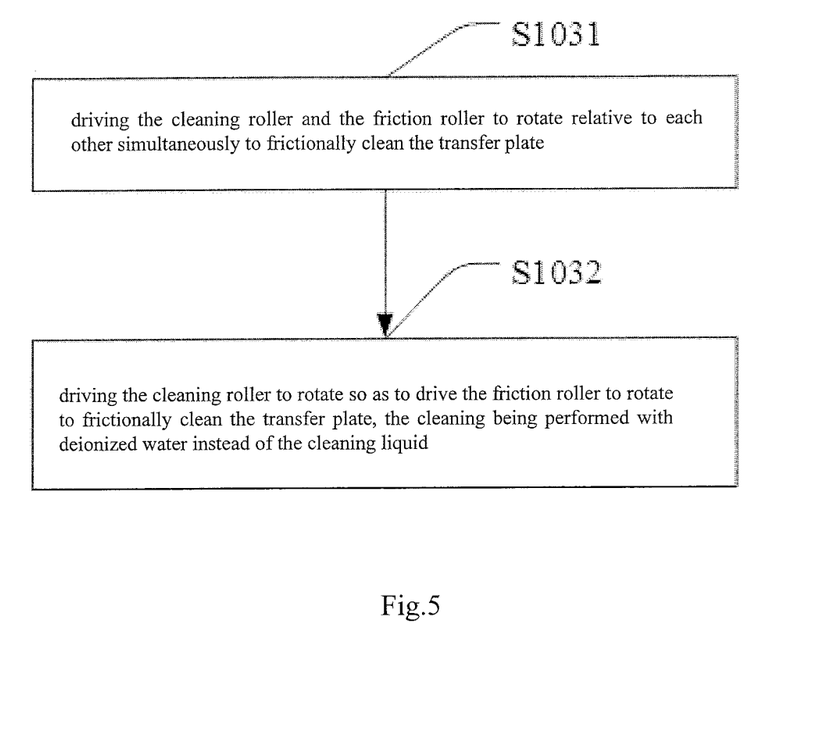
FIG. 5 is a flowchart of an alternative method of step S103 in FIG. 4.

In a specific implementation process, in step S103, the transfer plate is frictionally cleaned through the relative movement between the friction cleaning device and the cleaning roller, optionally the steps as shown in FIG. 5 are used:

Step S1031, driving the cleaning roller and the friction roller to rotate relative to each other simultaneously to frictionally clean the transfer plate. In this step, the friction force between the cleaning roller and the friction roller is relatively large, which may improve the cleaning efficiency;

Step S1032, driving the cleaning roller to rotate so as to drive the friction roller to rotate to frictionally clean the transfer plate, the cleaning being performed with deionized water instead of the cleaning liquid. In this step, the friction force between the cleaning roller and the friction roller is relatively small, and cleaning with deionized water will clean the residual cleaning liquid on the transfer plate and the solidified PI liquid generated in the previous step due to friction.

In an optional embodiment as shown in FIG. 4, the method provided by the present embodiment further comprises, Step S104, ultrasonically vibrating the transfer plate in the cleaning liquid using an ultrasonic cleaning device, outputting an ultrasonic wave of a corresponding frequency according to the diameter of the recess in the transfer plate, when frictionally cleaning the transfer plate by relative rotation between the friction cleaning device and the cleaning roller.

This step may further enhance cleaning effect on the transfer plate by ultrasonic cleaning.

Optionally, outputting an ultrasonic wave of a corresponding frequency according to the diameter of the recess in the transfer plate specifically comprises:

Outputting an ultrasonic wave of 40 kHz when the diameter of the recess in the transfer plate is larger than 10 µm;

Outputting an ultrasonic waves of 72 kHz when the diameter of the recess in the transfer plate is less than or equal to 10 µm.

The ultrasonic wave of corresponding frequency is output according to the diameter of the recess of the transfer plate, which may improve the ultrasonic cleaning efficiency and enhance the cleaning effect on the transfer plate.

In an optional embodiment as shown in FIG. 5, after frictionally cleaning the transfer plate by relative rotation between the friction cleaning device and the cleaning roller, the method further comprises:

Step S105, detecting the concentration of impurities in the cleaning liquid with a concentration detecting device;

Step S106, determine whether the concentration of impurities in the cleaning liquid exceeds a preset threshold;

Step S107, replacing the cleaning liquid when the concentration of impurities in the cleaning liquid exceeds the preset threshold.

In Steps S105-S107, the concentration of impurities in the cleaning solution may be detected to address the problem of the cleaning effect being deteriorated after the impurity concentration in the cleaning liquid exceeds the normal usable range.

Apparently, those skilled in the art may make various modifications and variations to the embodiments of the present disclosure without departing from the spirit and scope of the disclosure. In this way, if these modifications and variations of the disclosure fall within the scope of the claims of the disclosure and the equivalent technologies, the disclosure is also intended to include these modifications and variations.

What is claimed is:

1. An apparatus for cleaning a transfer plate, comprising
   a rack;
   a cleaning tank mounted on the rack and configured to hold a cleaning liquid therein;
   a cleaning roller pivotally mounted to the rack, at least a part of a cylindrical surface of the cleaning roller being located inside the cleaning tank, wherein a transfer plate fixing mechanism is provided on the cylindrical surface of the cleaning roller for fixing a transfer plate wound around the cylindrical surface, protrusions which correspond to recesses in the transfer plate one to one are provided on the cylindrical surface of the cleaning roller, and a vacuum suction hole for sucking the transfer plate is provided on the periphery of a protrusion, and wherein the protrusion is configured to raise up a bottom surface of the recess in a direction toward an opening of the recess at a side of the transfer plate facing away from the recess when the vacuum suction hole sucks the transfer plate;

a friction cleaning device mounted inside the cleaning tank, the friction cleaning device being configured to contact with the transfer plate wound around the cleaning roller and to frictionally clean the transfer plate through a relative movement between the cleaning roller and the friction cleaning device; and a drive device driving the cleaning roller and/or the friction cleaning device so as to generate the relative movement between the cleaning roller and the friction cleaning device.

2. The apparatus according to claim 1,
wherein the friction cleaning device comprises a friction roller pivotally mounted in the cleaning tank, and bristles for frictionally cleaning the transfer plate are provided on the cylindrical surface of the friction roller.

3. The apparatus according to claim 2,
wherein the drive device is a motor.

4. The apparatus according to claim 1,
wherein the friction cleaning device comprises a friction plate fixed inside the cleaning tank, and bristles for frictionally cleaning the transfer plate are provided on the friction plate.

5. The apparatus according to claim 1, further comprising an ultrasonic cleaning device, which comprises an ultrasonic transducer provided on a bottom surface of the cleaning tank and an ultrasonic generator electrically connected to the ultrasonic transducer.

6. The apparatus according to claim 1,
wherein the cleaning tank is provided with a concentration detecting device for detecting the concentration of impurities in the cleaning liquid.

7. The apparatus according to claim 1, further comprising a reservoir mounted on the rack and configured to receive the cleaning liquid discharged from the cleaning tank, and a liquid feeding pump for pumping the cleaning liquid in the reservoir into the cleaning tank.

8. The apparatus according to claim 7, further comprising a filtering device for filtering the cleaning liquid pumped into the cleaning tank from the reservoir.

9. The apparatus according to claim 1,
wherein the transfer plate fixing mechanism is a fixing clip.

10. A method for cleaning a transfer plate, comprising:
winding and fixing the transfer plate onto a cylindrical surface of a cleaning roller, such that a side of the transfer plate provided with a recess faces away from the cylindrical surface of the cleaning roller,
sucking the transfer plate with vacuum suction holes provided in the cylindrical surface of the cleaning roller, such that a protrusion provided in the vacuum suction hole raises up a bottom surface of the recess corresponding to the protrusion in a direction toward an opening of the recess at a side of the transfer plate facing away from the recess, and
immersing the transfer plate into a cleaning liquid in a cleaning tank, and frictionally cleaning the transfer plate by relative rotation between a friction cleaning device and the cleaning roller.

11. The method for cleaning a transfer plate according to claim 10, wherein frictionally cleaning the transfer plate by relative rotation between the friction cleaning device and the cleaning roller comprises following steps:
frictionally cleaning the transfer plate by relative rotation between a friction roller and the cleaning roller; or
frictionally cleaning the transfer plate by relative rotation between a friction plate and the cleaning roller.

12. The method for cleaning a transfer plate according to claim 11, wherein the step of frictionally cleaning the transfer plate by relative rotation between the friction roller and the cleaning roller comprises:
driving the friction roller to rotate to drive the cleaning roller to rotate so as to frictionally clean the transfer plate; or
driving the cleaning roller to rotate to drive the friction roller to rotate so as to frictionally clean the transfer plate; or
driving both the cleaning roller and the friction roller to rotate relatively so as to frictionally clean the transfer plate.

13. The method for cleaning a transfer plate according to claim 12, wherein after the step of driving both the cleaning roller and the friction roller to rotate relatively to frictionally clean the transfer plate, the method further comprises:
driving the cleaning roller to rotate to drive the friction roller to rotate so as to frictionally clean the transfer plate, and cleaning the transfer plate with deionized water.

14. The method for cleaning a transfer plate according to claim 10, wherein the method further comprises:
ultrasonically vibrating the transfer plate in the cleaning liquid by using an ultrasonic cleaning device, and outputting an ultrasonic wave of a corresponding frequency according to the diameter of the recess in the transfer plate, when frictionally cleaning the transfer plate by relative rotation between the friction cleaning device and the cleaning roller.

15. The method for cleaning a transfer plate according to claim 14, wherein outputting an ultrasonic wave of a corresponding frequency according to the diameter of the recess in the transfer plate comprises:
outputting an ultrasonic wave of 40 kHz when the diameter of the recess in the transfer plate is larger than 10 µm;
outputting an ultrasonic wave of 72 kHz when the diameter of the recess in the transfer plate is less than or equal to 10 µm.

16. The method for cleaning a transfer plate according to claim 10, wherein after frictionally cleaning the transfer plate by relative rotation between the friction cleaning device and the cleaning roller, the method further comprises:
detecting the concentration of impurities in the cleaning liquid by a concentration detecting device; and
replacing the cleaning liquid when the concentration of impurities in the cleaning liquid exceeds a preset threshold.

* * * * *